(12) United States Patent
Kumomura et al.

(10) Patent No.: US 6,477,521 B1
(45) Date of Patent: Nov. 5, 2002

(54) INTEGRATED INFORMATION PROCESSING SYSTEM CAPABLE OF SUPPLYING SPECIFIC INFORMATION TO PERSON

(75) Inventors: Akira Kumomura, Musashino; Tsuyoshi Hamaguchi, Yokosuka, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/722,539

(22) Filed: Nov. 28, 2000

Related U.S. Application Data

(63) Continuation of application No. 08/045,084, filed on Apr. 12, 1993, now abandoned.

(30) Foreign Application Priority Data

Apr. 23, 1992 (JP) .............................................. 4-104310

(51) Int. Cl.⁷ .............................................. G06F 17/30
(52) U.S. Cl. ......................... 707/1; 707/104.1; 705/14; 705/35
(58) Field of Search ....................... 707/1–5, 10, 104.1, 707/200; 705/70, 14, 35–43

(56) References Cited

U.S. PATENT DOCUMENTS

| | | | |
|---|---|---|---|
| 4,025,905 A | 5/1977 | Gorgens | 709/227 |
| 4,581,484 A | 4/1986 | Bendig | 379/88.13 |
| 4,633,397 A | 12/1986 | Macco | 705/30 |
| 4,648,037 A | 3/1987 | Valentino | 705/36 |
| 4,673,802 A | 6/1987 | Ohmae et al. | 705/17 |
| 4,727,243 A | 2/1988 | Savar | 705/17 |
| 4,800,488 A | 1/1989 | Agrawal et al. | 709/225 |
| 4,825,354 A | 4/1989 | Agrawal et al. | 707/10 |
| 4,872,113 A | 10/1989 | Dinerstein | 705/10 |
| 5,163,131 A | 11/1992 | Row et al. | 709/202 |
| 5,220,501 A | 6/1993 | Lawlor et al. | 705/40 |
| 5,247,670 A | 9/1993 | Matsunaga | 709/203 |
| 5,341,478 A | 8/1994 | Travis, Jr. et al. | 709/203 |
| 5,345,549 A | 9/1994 | Appel et al. | 345/741 |
| 5,388,165 A | 2/1995 | Deaton et al. | 382/139 |

FOREIGN PATENT DOCUMENTS

| | | | |
|---|---|---|---|
| JP | 2-128273 | Kind A | 5/1990 |
| JP | 2-247791 | Kind A | 10/1990 |

Primary Examiner—Maria N. Von Buhr
(74) Attorney, Agent, or Firm—Antonelli, Terry, Stout & Kraus, LLP (57) ABSTRACT

A central processing apparatus, a distributed processing apparatus, and a transaction processing terminal constitute a transaction processing system. A central processing apparatus, a distributed processing apparatus, and an information supply terminal constitute an information supply system. These systems are mutually connected. A customer data base stores customer attributes or service information for each customer. A service information conditioning file stores target customer conditions for the respective service. The transaction processing terminal will communicate with the central processing apparatus and the like to perform the transaction process for the customer who visits the branch of the financial institute, and at the same time, to retrieve the customer data bases, and the file belonging to the information supply system so as to display service information on the display.

9 Claims, 7 Drawing Sheets

| CUSTOMER NO. | CUSTOMER NAME | GROUP | ATTRIBUTE | | | | | | SALES PROMOTION | | |
|---|---|---|---|---|---|---|---|---|---|---|---|
| | | | CHARACTERISTICS | | | TRANSACTION | | ASSETS | | | |
| | | | SEX | AGE | – – | DEPOSIT | | | MMC | CARD | PENSION |
| 001 | | | | | | | | | | | |
| 002 | | | | | | | | | | | |
| 003 | | | | | | | | | | | |
| 004 | | | | | | | | | | | |
| 005 | | | | | | | | | | | |

FIG. 4

SERVICE FILE

| SERVICE NO. | SERVICE NAME | SERVICE CONTENT | | CONDITION 1 | CONDITION 2 |
|---|---|---|---|---|---|
| | | TERM | RATE OF INTEREST | | |
| 001 | | | | AGE ≧ 60 YEARS OLD DEPOSIT≧1 MILLION YEN | |
| 002 | | | | | |
| 003 | | | | | |
| 004 | | | | | |

| DESIGNATION FOR TRANSACTION CONTENT | |
|---|---|
| 1. BRANCH NUMBER + ACCOUNT NUMBER | ________ |
| 2. TRANSACTION ITEM | ____ |
| 3. TRANSACTION SECTION | _____ |
| 4. AMOUNT | ________ |
| 5. SALES INFORMATION ADDITION | REQUIRED   NOT REQUIRED |

FIG. 6B

DESIGNATION FOR SALES INFORMATION RETRIEVAL

1. SERVICE
   a. PROMOTION   b. SPECIFIC SERVICE NAME   c. NO DESIGNATION

2. CUSTOMER
   a. CUSTOMER NAME   b. BRANCH   c. ANOTHER BRANCH

3. FILE
   INFORMATION SUPPLY              TRANSACTION PROCESS
   a. SYSTEM FILE                  b. SYSTEM FILE

INTEGRATED INFORMATION PROCESSING SYSTEM CAPABLE OF SUPPLYING SPECIFIC INFORMATION TO PERSON

REFERENCE TO EARLIER FILED APPLICATION(S)

This application is a continuation of the following earlier filed application(s): Ser. No. 08/045,084 filed Apr. 12, 1993, abandoned.

BACKGROUND OF THE INVENTION

1. Field of the Invention

The present invention relates to an integrated information processing system in which a transaction processing system of, for instance, a financial institution is mutually connected to an information supply system thereof. More specifically, the present invention is directed to an integrated information processing system suitable for performing a process requested by a person, for quickly supplying information fitted to the person.

2. Description of the Related Art

In general, the conventional transaction processing system of the financial institution and the conventional information supply system have been independently constituted as a separate system. In the conventional transaction processing system, the normal transaction process can be merely performed and the transaction content requested by the customer can be merely checked. On the other hand, in the terminal unit of the information supply system, the financial market information and the financial service information are merely provided to the respective customers.

As described above, in accordance with the conventional system architecture, no specific care is taken to supply various sorts of financial information to the respective customers, while utilizing the transaction terminal units of the branches at the financial institutions. Furthermore, a staff member at the branch executes the normal transaction to the customers who visit the branch, but at the same time, cannot supply such a financial information suitable for needs of these customers, namely cannot provide a careful service to these customers.

For instance, there has been described in JP-A-62-111348 such a computer integrated system that different sorts of data bases are used in the plural computer systems. However, no description is made that the transaction processing system of the financial institution is combined with the information supply system thereof.

SUMMARY OF THE INVENTION

An object of the present invention is to provide an integrated information processing system capable of simultaneously-and quickly providing a transaction processing operation and sales information to a customer in a transaction terminal unit installed at a branch of a financial institution.

A first aspect of the present invention is to provide such an integrated information processing system for retrieving sales information corresponding to a customer and also customers having the same sales information, thereby to output the retrieved sales information.

A second aspect of the present invention is to provide an integrated information processing system for retrieving sales information of a customer belonging to the same customers, thereby to output the retrieved sale information.

A third aspect of the present invention is to provide an integrated information processing system for retrieving sales information fitted to a condition of a customer, thereby outputting the retrieved sales information.

DESCRIPTION OF THE PREFERRED EMBODIMENTS

An integrated information processing system according to one preferred embodiment of the present invention will now be described in detail with reference to the accompanying drawings.

Figure 1:
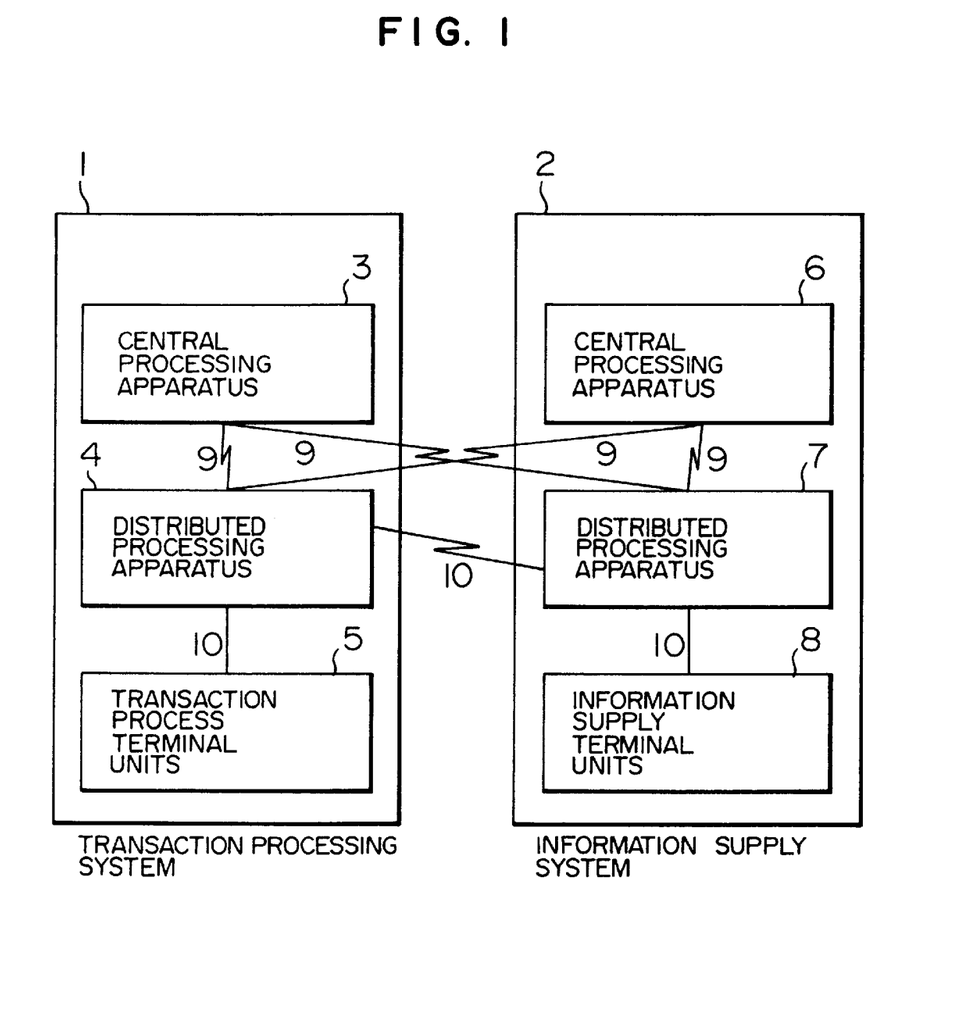
FIG. 1 schematically illustrates an overall arrangement of an integrated information processing system according to one embodiment of the present invention.

FIG. 1 schematically shows an overall arrangement of the integrated information processing system according to the embodiment of the present invention. In FIG. 1, a transaction processing system 1 is connected via a communication network 9 to an information supplying system 2. The transaction processing system 1 includes a central processing apparatus 3, a plurality of distributed processing apparatuses 4 connected to the central processing apparatus 3 through the network 9, and one or more transaction process terminal units 5 connected to each apparatus 4. The information supplying system 2 includes a central processing apparatus 6, a plurality of distributed processing apparatuses 7 connected to the central processing apparatus 6 through the network 9, and one or more information supply terminal units 8 connected to each apparatus 7. The terminal unit 5 is installed at a branch of a financial institution and operated by a staff member, whereas the terminal unit 8 is installed at a corner of the branch and operated by a customer and a staff member. Also the distributed processing apparatuses 4 and 7 are installed at the branch, and are connected via a transmission path 10 such as a LAN (Local Area Network) to the terminal units 5 and 8, respectively. The central processing apparatuses 3 and 6 are installed at a center of the financial institute, and are connected via a communication network 9 to the distributed processing apparatuses 4 and 7 provided at the respective branches of the financial institute. It may be conceived that the distributed processing apparatuses 7 and the terminal units 8 of the information supplying system 2 are integrally formed to constitute a workstation.

Figure 2:
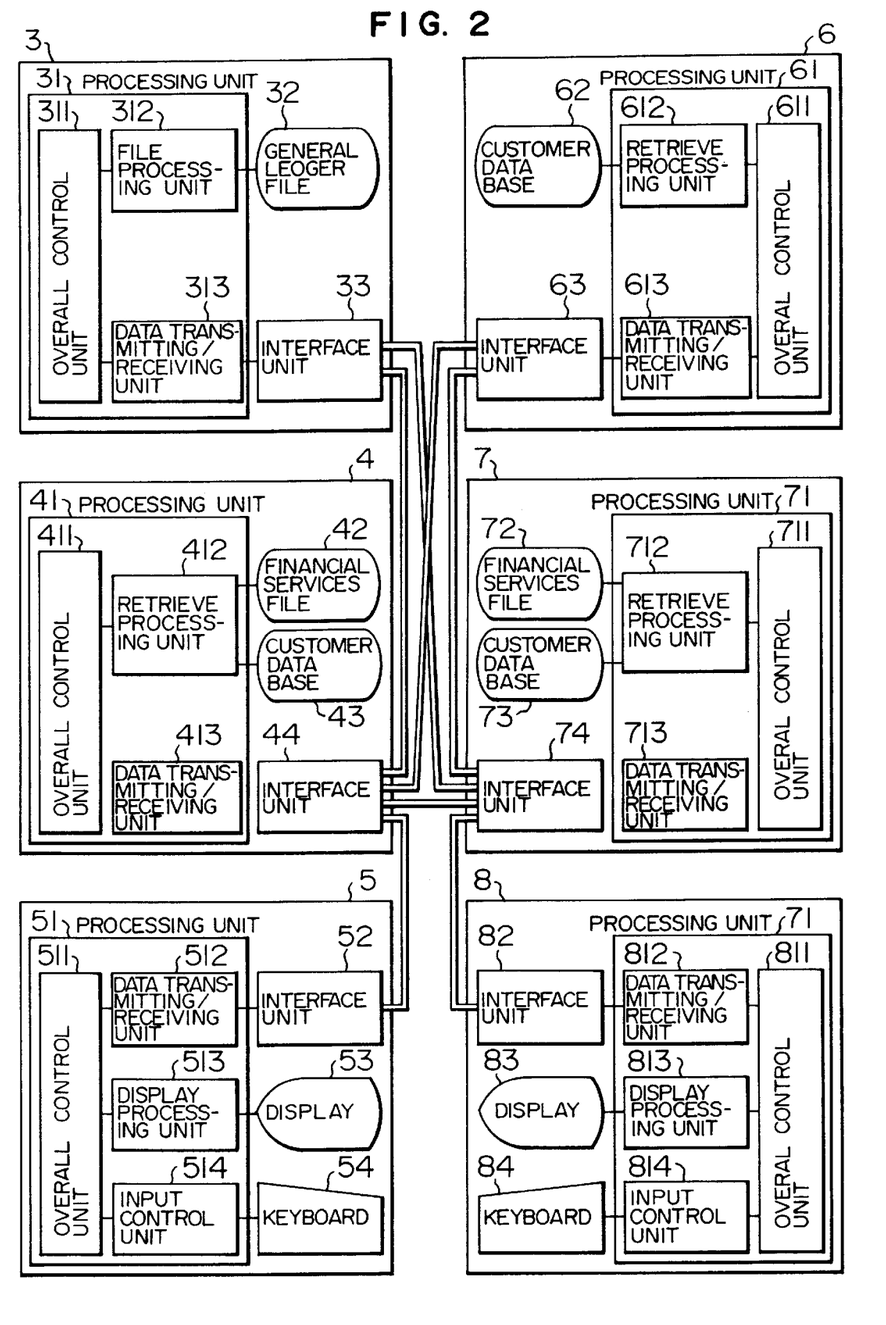
FIG. 2 schematically represents a detailed arrangement of the respective apparatuses employed in the integrated information processing system shown in FIG. 1.

FIG. 2 schematically indicates a detailed arrangement of the central processing apparatus, distributed processing apparatus and terminal unit shown in FIG. 1.

In the transaction processing system 1, the central processing apparatus 3 includes a processing unit 31, a general ledger file 32, and an interface unit 33. Further, the processing unit 31 includes an overall control unit 311 for controlling an entire portion of the central processing apparatus, a file processing unit 312 for accessing the file 32, and a data transmitting/receiving unit 313 for transmitting/receiving data with the interface unit 33. The distributed processing apparatus 4 includes a financial services file 42, a customer data base 43, and an interface unit 44. The processing unit 41 includes an overall control unit 411 for controlling an overall portion of the distributed processing apparatus, a retrieve processing unit 412 for retrieving a financial service from the file 42 and the customer data base 43, and a data transmitting/receiving unit 413 for transmitting/receiving data with the interface unit 44. The transaction process terminal unit 5 includes a processing unit 51, an interface unit 52, a display 53, and a keyboard 54. The processing unit 51 includes an overall control unit 511 for controlling an overall portion of the terminal unit, a data transmitting/receiving unit 512 for transmitting/ receiving data with the interface unit 33, a display processing unit 513 for controlling the display 53, and an input control unit 514 for controlling the keyboard 54.

In the information supply system, the central processing apparatus 6 includes a processing unit 61, a customer data base 62, and an interface unit 63. The processing unit 61 includes an overall control unit 611 for controlling an overall portion of the central processing apparatus, a retrieve processing unit 612 for retrieving customer data from the customer data base 62, and a data transmitting/receiving unit 613 for transmiting/receiving data with the interface unit 63. The distributed processing apparatus 7 includes a processing unit 71, a financial services file 72, a customer data base 73, and an interface unit 74. The processing unit 71 includes an overall control unit 711 for controlling an overall portion of the distributed processing apparatus, a file processing unit 712 for retrieving a financial service from the file 72 and customer data from data base 73, and also a data transmitting/receiving unit 713 for transmitting/receiving data with the interface unit 74. The information supply terminal apparatus 8 includes a processing unit 81, an interface unit 82, a display 83, and a keyboard 84. The processing unit 81 includes an overall control unit 811 for controlling an overall portion of the terminal apparatus, a data transmitting/receiving unit 812 for transmitting/receiving data with the interface unit 82, a display processing unit 813 for controlling the display 83, and an input control unit 814 for controlling the keyboard 54.

In FIG. 2, the customer data base 62 stores personal information of all customers who opened accounts with a financial institution, and the customer data base 43 or 73 of the distributed processing apparatus 4 or 7 stores, in principle, only a portion of the personal information of customers who opened accounts with the branch of the financial institution where the apparatus 4 or 7 is installed, namely personal information portion of only the customers who have financial accounts in the branch.

Figure 3:
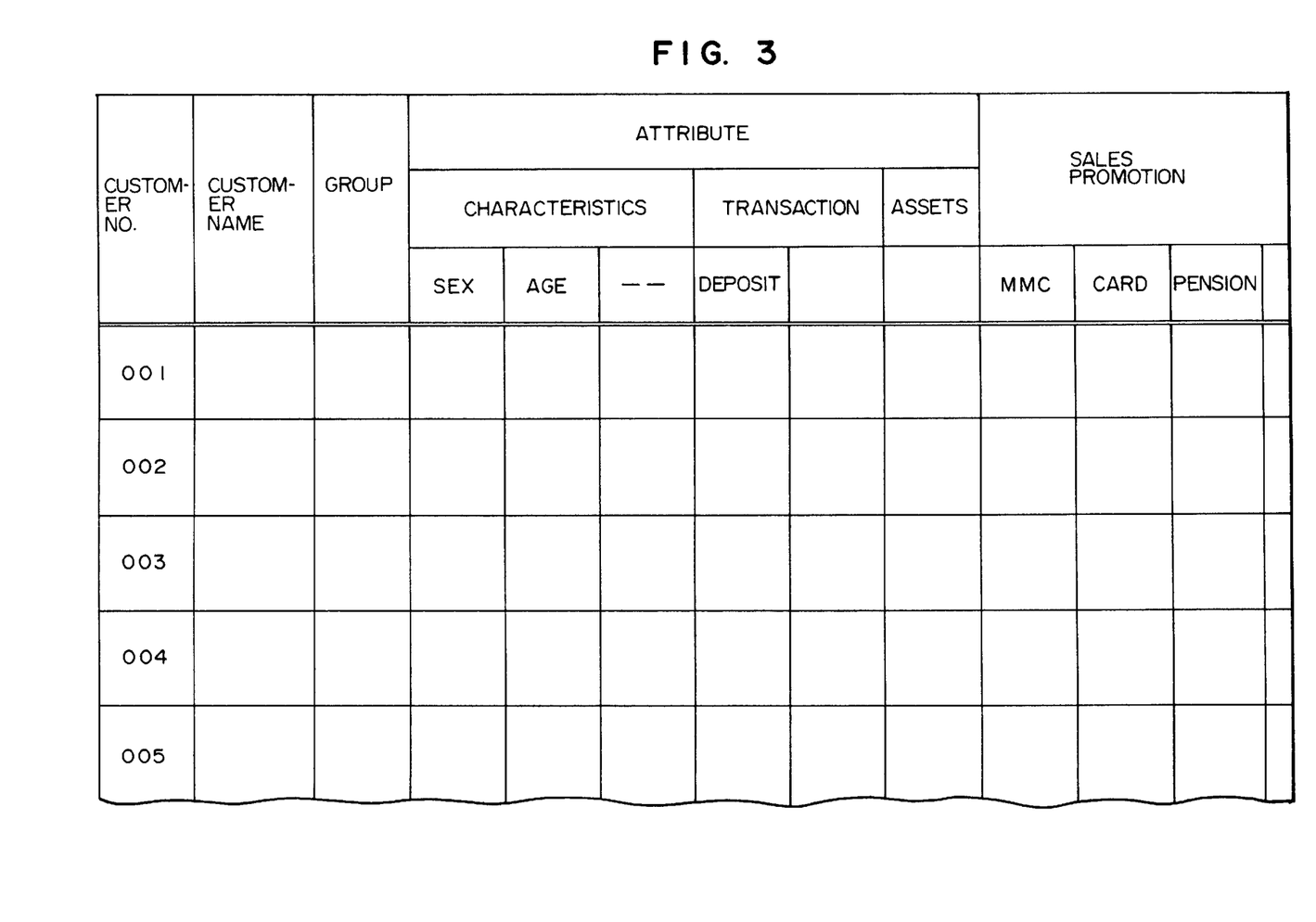
FIG. 3 schematically shows an example of an arrangement for a customer data base employed in the integrated information processing system of FIG. 1.

As shown in FIG. 3, a record of the customer data base for each customer has such columns as an identifier, a customer name, a group, characteristics, a transaction state, assets, and sales promotion. In the columns of the sales promotion, there is stored either a code, or the name of a financial service used for the sales promotion to the customer, e.g., a campaign service for a certain term. These are previously determined based on the customer's characteristics, transaction states, and assets of the customer (will be referred to a "customer attribute" as a general term). In case that there is no sales promotion to be recommendable for a customer, the columns of the sales promotion remain empty. Customers are grouped on the basis of life stages and/or life styles to obtain group codes of these customers, and these group codes are previously registered in the group column.

An identifier, a name, and an attribute of a customer are stored in the customer data base 43. An identifier, a name, a group, and a sales promotion service to a customer are stored in the customer data base 73. That is to say, the information stored in the customer data base 43 is different from that of the customer data base 73.

Figure 4:
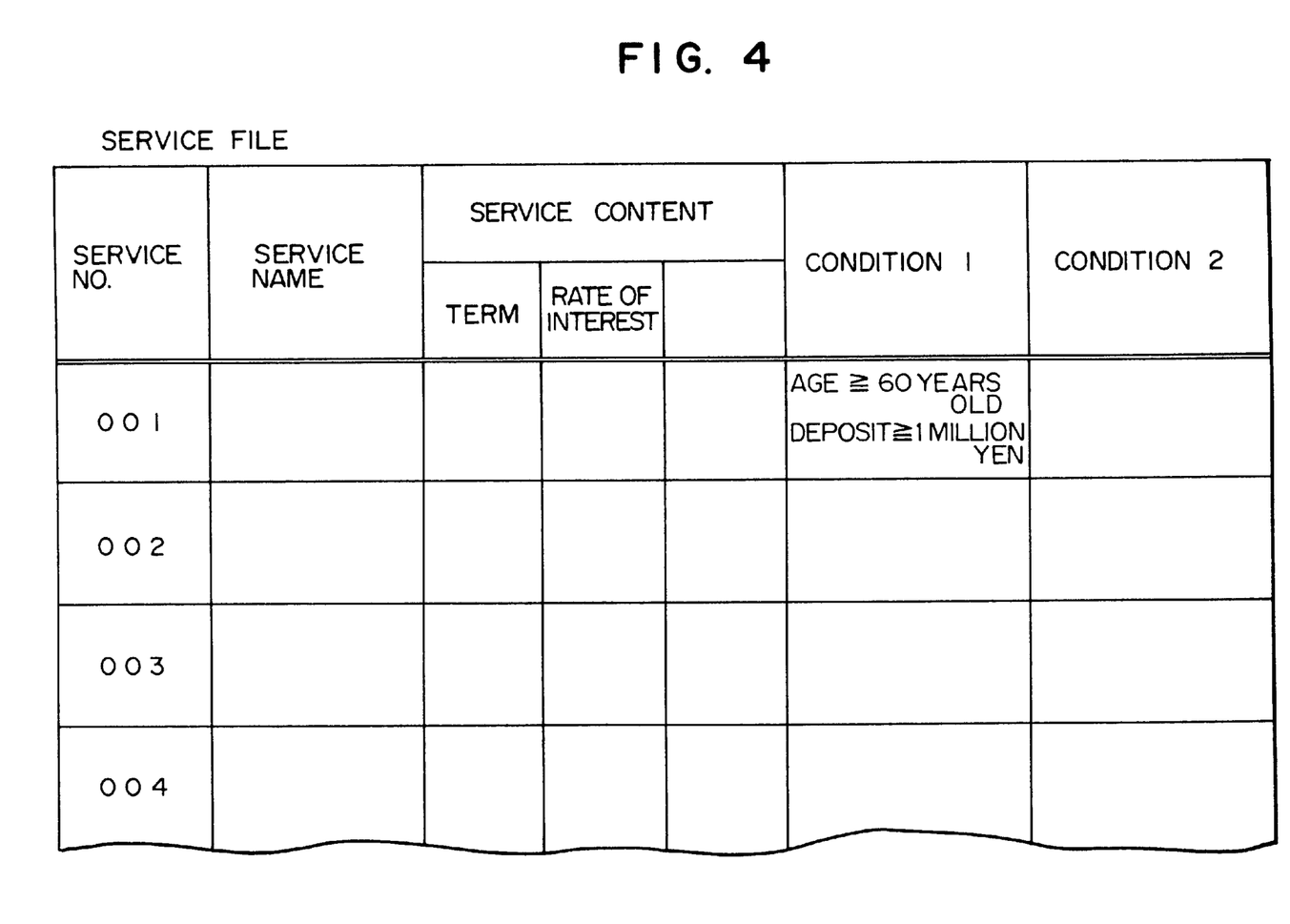
FIG. 4 schematically indicates an example of an arrangement for a service information file employed in the integrated information processing system of FIG. 1.

As represented in FIG. 4, the financial services files 42 and 72 have such columns of service numbers, service names, service contents of a term, a rate, etc. and conditions of customers for sales promotion. The customer condition implies a condition of a customer layer for a service to be provided. One or plural customer conditions are previously registered in the files 42 and 72 for each service. With these services files as well as the customer data bases, the same information may be stored in the files 42 and 72 of the distributed processing apparatuses 4 and 7. Otherwise, the different information may be distributed and stored into the files 42 and 72, depending upon the services.

Figure 5A:
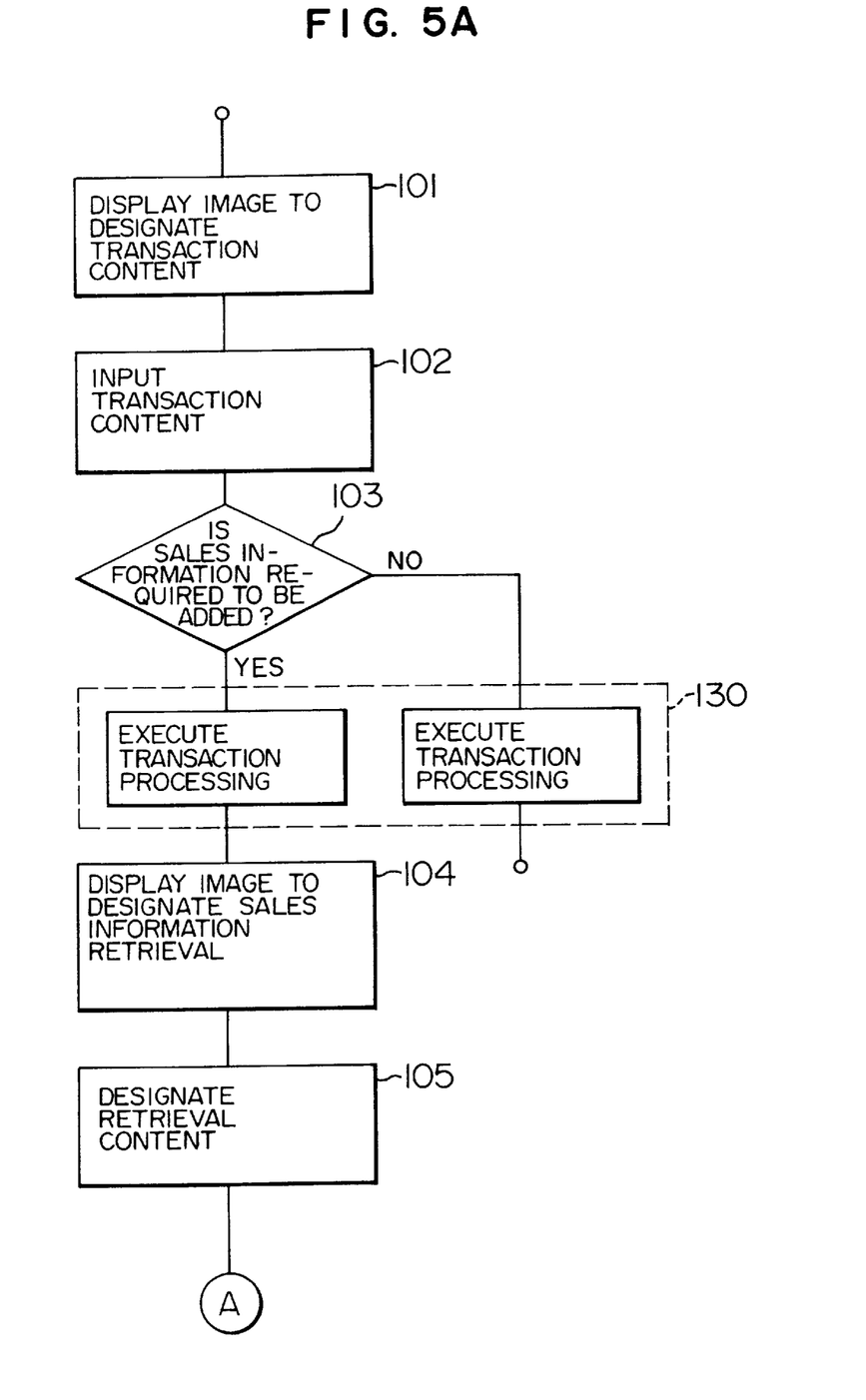
FIGS. 5A and 5B are flow charts for explaining processing operations of information supply according to the integrated information process system of FIG. 1.
Figure 5B:
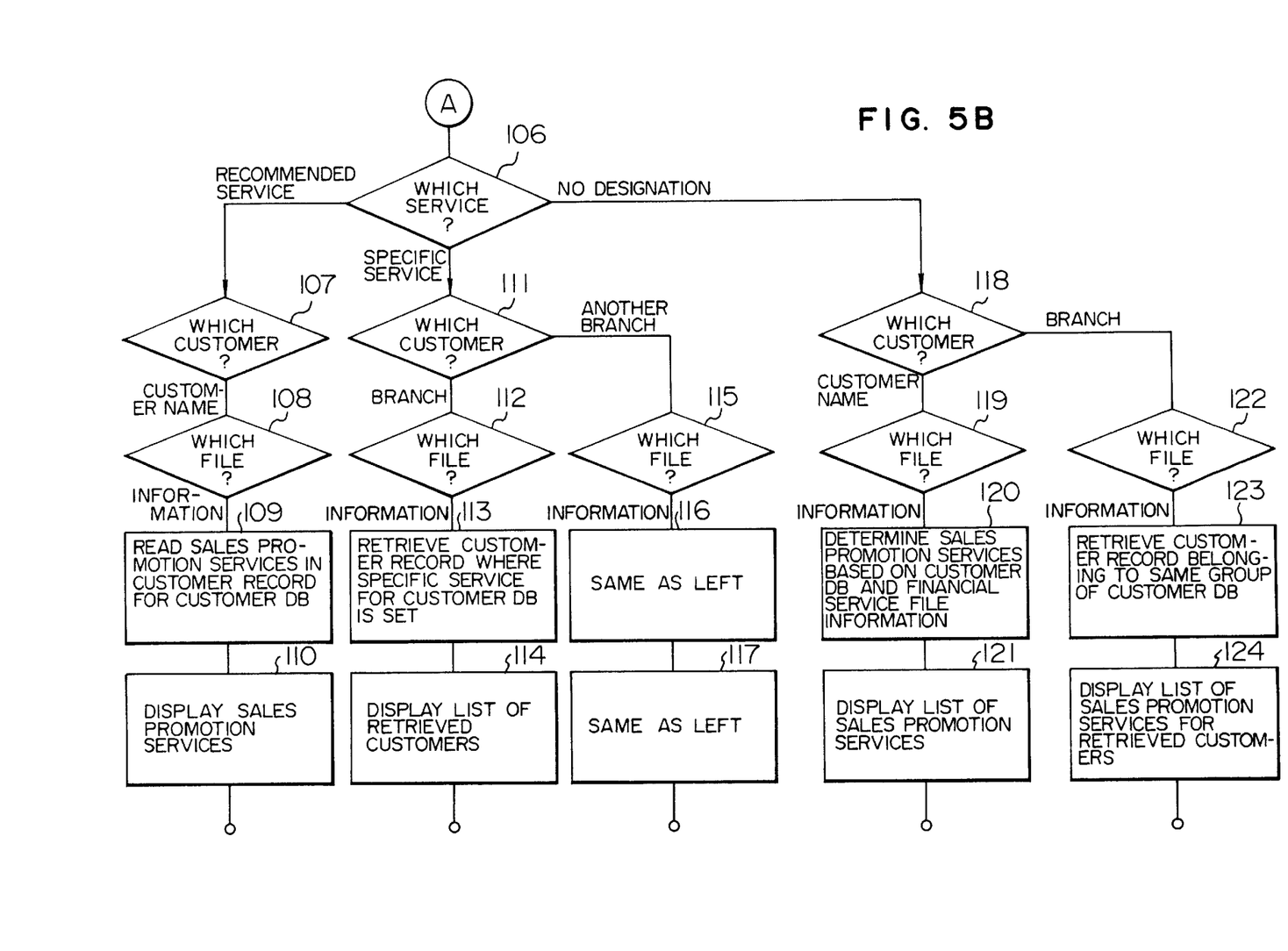

Referring now to FIGS. 5A and 5B, an operation of the integrated information processing system according to the embodiment of the present invention will be described.

In the customer data base 62, for instance, financial services such as a campaign services for a certain term are previously stored in accordance with the customer attribute for the respective customers. In case that customer layers who can become promotion targets are clearly recognized, the customer conditions are previously stored in the services files for each service. Furthermore, the customers are previously grouped, if possible, based on a constant basis such as a life stage and a life style, and then the codes of the groups are registered into the respective customer records. When the customer data base is updated, the customer record is transferred via the communication network 9 to the distributed processing apparatuses 4 and 7 based on the branch of the financial institute where an account has been opened.

In case that a customer visits a branch of a financial institute to request a transaction process, a staff member at this financial institute branch performs the transaction process by utilizing the transaction process terminal unit, and at the same time, designates the retrieval of information about the financial services, so that the financial services to be promoted for the customer is displayed on the display of the terminal unit.

Figure 6A:
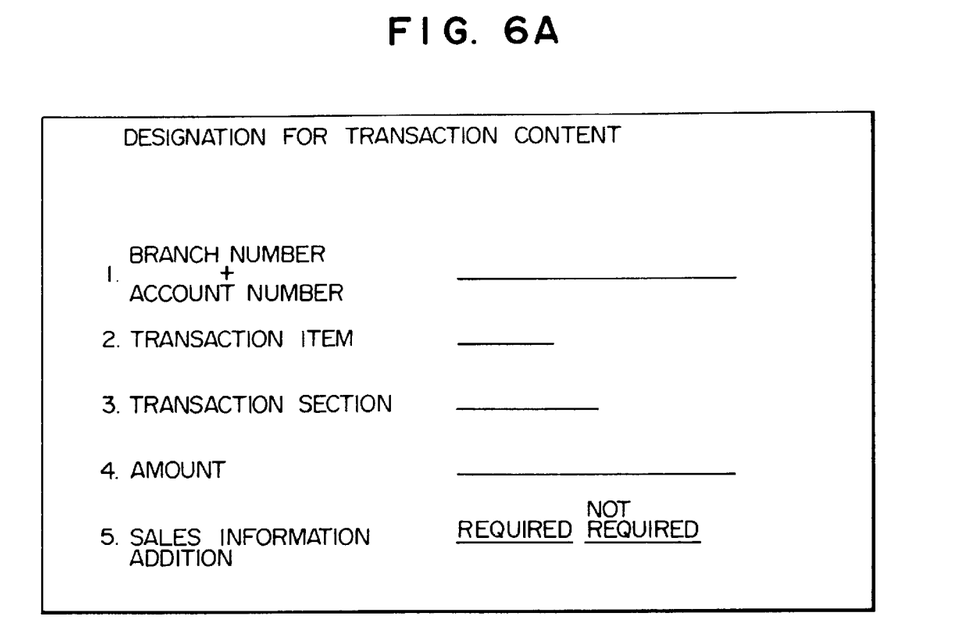
FIGS. 6A and 6B are display screens of designation for contents of transaction process and of designation for sales information retrieval.

More specifically, the staff member at this branch designates a transaction screen from the keyboard 54 of the terminal unit 5, so that an image used to designate the content of this transaction as shown in FIG. 6A is represented on the display 53 under control of the overall control unit 511 (step 101). While looking at the image, the staff member enters from the keyboard 54 both of the contents of the transaction such as the branch number, the deposit number, the transaction item, the transaction section, and amounts, and also a service information adding code for designating whether or not the financial services to be promoted to the customer should be displayed (step 102).

Figure 6B:
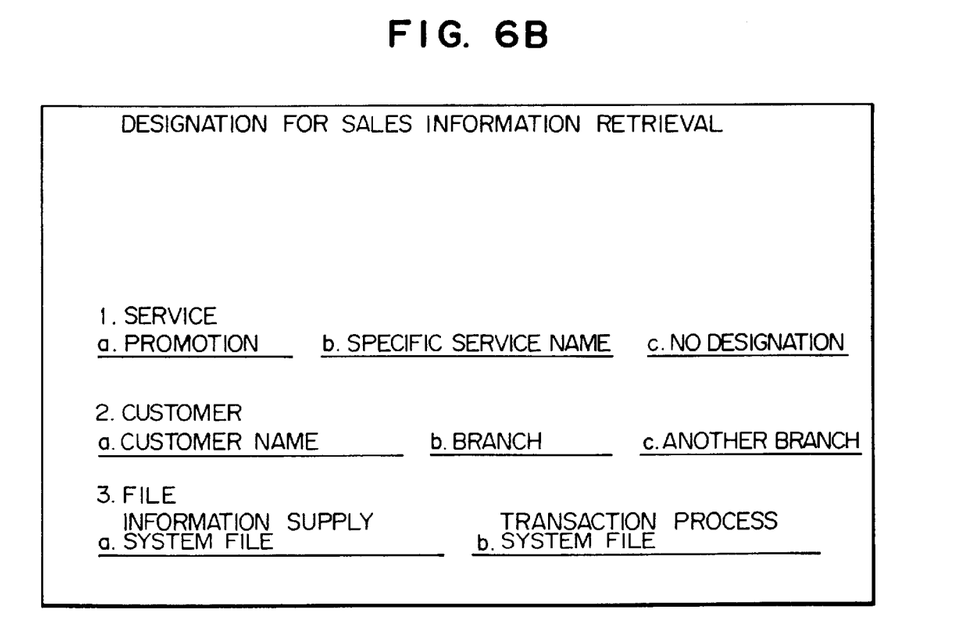

Under control of the control unit 511, the terminal unit 5 judges whether or not the adding code is designated (step 103). If this adding code is not designated, then the terminal unit 5 communicates with the central processing apparatus 3 via the distributed processing apparatus 4 using the customer data base 43, so that only the normal transaction process is carried out (step 130). If the adding code is designated, then after this transaction process, an image used to designate the retrieve condition of service information shown in FIG. 6B is displayed (step 104). While looking at this image, the staff member inputs from the keyboard 54 the content of each item such as the code thereof with respect to a retrieval condition as the financial service, the customers and the files (step 105).

Under control of the control unit 511, the terminal unit 5 judges the entered retrieval conditions. When the financial services corresponds to the campaign promotion, the customer corresponds to one coming into branch, and furthermore the file corresponds to the information supply system file (a process path defined by step 106, step 107 and step 108), this terminal unit 5 will communicate via the distributed processing apparatus 4 to which this terminal unit 5 is connected, with the distributed processing apparatus 7 of the information supply system 2, or with the central processing apparatus 6, if necessary. As a result, the terminal unit 5 retrieves a customer record from either the customer data base 73 or 62 to thereby read out the sales promotion set therein (step 109). A decision on which of the data bases 62 and 73 is to be searched, is performed on the basis of the branch number of the customer inputted at the previous step 102. In other words, if the branch number corresponds to this branch, the customer data base 73 of the distributed processing apparatus 7 is searched, whereas if the branch number corresponds to another branch, then the customer data base 62 in which all the customer records have been stored is searched. The sales promotion services which have been retrieved in the above-described manner, are represented on the display 53 under control of the control unit 51 of the terminal unit 5 (step 110).

Subsequently, the terminal unit 5 judges the retrieval condition entered at the above step 105, and communicates via the distributed processing apparatus 4 with the distributed processing apparatus 7 or the central processing apparatus 6 under control of the control unit 511 in case that the financial services condition is a specific one, the customer condition is an unspecified customer, and the file condition corresponds to the information supply system file (a process path defined by step 106, step 111 and step 112). Then, this terminal unit 5 retrieves the customer record in which the designated specific services has been set as the sales promotion services, from any one of these customer data base 73 and 62 (step 113), and displays a list of customer names on the display 53 (step 114). Also in this case, a decision on which of the customer data bases 62 and 73 is searched, is performed on the basis of the ranch number of the customer which has been entered at the step 102. In case that the retrieval condition inputted at the step 105 is such that the financial service condition is a specific one, the customer has an account at another branch, and the file condition is the information supply system file (a process path defined by step 106, step 111, and step 115), all of the records of the customer data base 62 of the central processing apparatus 6 are searched (step 116), and then a list of customer names of the retrieved customer records in which the designated specific services have been set for the sales promotion, is displayed on the display 53 (step 117). It should be noted in this case that the customer records for a group of predetermined branches may be searched.

Next, when the retrieval conditions inputted at the step 105 is given that no service is designated, the customer is such a customer who visits the branch of the financial institute, and the file corresponds to the information supply system file (a process path defined by step 106, step 118, and step 119), the terminal unit 5 will communicate with the distributed processing apparatus 7, and the central processing apparatus 6, if necessary, via the distributed processing apparatus 4 under control of the control unit 511. First, this terminal unit 5 reads out the customer attribute (i.e., customer characteristics, transaction state, and assets condition and so on) registered in the customer record for this customer from the customer data base 73 or 62, and thereafter compares the customer attribute with the sales possible customer conditions registered in the respective service records of the service file 72 to sequentially read out the names of financial services which can satisfy this condition (step 120), and also to display a list of the sales promotion services on the display 53 (step 121).

Then, when the retrieval condition inputted at the step 105 is such that no service is designated, the customer is an unspecified customer for the branch of this financial institute, and the file corresponds to the information supply system file (a process path defined by step 106, step 118, and step 122), the terminal unit 5 will communicate the distributed processing apparatus 7 and the central processing apparatus 6, if required, via the distributed processing apparatus 4 under control of the control unit 511 in order to retrieve the customer records which hold the same customer group code as the customer record for the customer having the account at the branch, from the customer data base 73, or 62 (step 123), and also to display a list of this sales promotion services on the display 53 (step 124).

While the operation example of the information supply process to the customers according to the integrated information processing system of this embodiment has been described, if the transaction processing system file is designated as the objective file at the step 105 shown in FIG. 5A, similar process to the above information supply process may be carried out by utilizing financial service file 42 and the customer data base 43 of the distributed processing apparatus 4. Alternatively, a careful service of supplying the financial information may be provided to customers under control of the overall control unit 811 by way of the information supply terminal unit 8 in a similar manner to that of the terminal unit 5.

As described above, the information about the financial service is outputted via the display processing unit on the display of the terminal unit. However, it would be apparent to a person skilled in the art that a voice processing unit and a speaker may be employed instead of, or in the addition to the above-explained display processing unit and display unit. In this case, such a financial service information could be acoustically supplied to customers. Although the terminal unit 5 is operated by the staff member, a user may designate the contents of transaction by utilizing a card or the like through the terminal unit. In this case, the addition code is automatically required and the sales information is retrieved.

What is claimed is:

1. A method of automatically offering and providing sales information customized to an account customer in a financial institution comprising a display device, an input device, and a control device controlling said devices, comprising:

providing a customer database storing attribute information for each customer and service information regarding service that is to be promoted to a customer;

providing a service information file storing services information regarding service contents for each service name and sales objective customer condition information for each of said services representing conditions to be satisfied to determine whether to promote purchasing of a service;

inputting information which specifies a customer into said input device and, based on said input information, retrieving attribute information regarding said specified customer for said customer database;

based on the tetrieved attribute information, retieving services information from said sales objective customer condition information stored in said service information file which satisfies conditions for promoting sales of said retrieved services to said specified customer database a customer identified as having the same service information as that service to be promoted to specified customer; and outputting said retrieved services information and said retrieved attribute information to said displat divice.

2. The method as claimed in claim 1 for use with a banking system including a transaction system and an information providing system, each of which includes a central processing unit, said central processing unit in said information providing system including a database of all customers of said banking system, at least one distributed processor for each business branch of said banking system, and at least one terminal for each business branch of said banking system, each said distributed processor including a service file and a customer file, each distributed processor judging whether customer information entered into a terminal connected to one specific business branch is for a customer of said specific branch, wherein when customer information is judged to be for said specific branch, said processor accesses said customer file of said specific business branch to obtain customer information, and when customer information is judged not to be for specific branch, said process accesses said central processing unit of said information system to obtain customer information.

3. A method as claimed in claim 1, further comprising:

providing an information supply host connected to a communication network and including a master personal data base for retrieving information from said master personal data base in response to an inputted retrieval command, thereby to output the retrieved information, said master personal data base including a plurality of personal records, and each of said personal records containing a personal identifier and selectively assigned personal information;

providing a processing host connected to said communication network, and including a master file to store a processing result, for updating said master file in response to an inputted update command, thereby outputting an updated result; and providing a distributed processing apparatus installed at a business location of said financial institute and connected to said communication network and a terminal, including a branch personal database, and responsive to a processing request inputted from said terminal, said branch personal database including a plurality of personal records related to said business location and each of said personal records containing a personal identifier and selectively assigned personal information, said processing request containing the personal identifier, and said identifier containing information to identify said business location, said distributed processing apparatus executing a processing, for outputting the update command to said processing host, for judging whether or not said personal identifier is related to said business location, for retrieving said personal information from said branch personal database in accordance with said personal identifier when it is judged that said personal identifier is related to said business location, for outputting the retrieval command to said information supply host to receive the retrieved personal information when it is judged that said personal identifier is not related to said business location and for supplying the retrieved personal information together with the processing result to said terminal in response to the update result received from the processing host.

4. A method as claimed in claim 1, further comprising:

providing each said customer in said customer database with a personal identifier and selectively assigning information predetermined based on personal attribute data;

providing a master file for storing a processing result; and providing processing means responsive to a processing request containing a personal identifier, for performing said processing and updating said master file, for retrieving a personal record from said personal data base based on said personal identifier, and for supplying the assigned information of the retrieved personal record together with the processing result.

5. An integrated information processing system comprising:

a communication network;

an information supply host connected to said communication network, and including a master personal data base, for retrieving information from said master personal data base in response to an inputted retrieval command, thereby to output the retrieved information, said master personal data base including a plurality of personal records, and each of said personal records containing a personal identifier and selectively assigned personal information;

a processing host connected to said communication network, and including a master file to store a processing result, for updating said master file in response to an inputted update command for thereby outputting an updated result; and a distributed processing apparatus installed at a branch, connected to said communication network and a terminal, including a branch personal data base, and responsive to a processing request inputted from said terminal, said branch personal data base including a plurality of personal records related to said branch and each of said personal records containing a personal identifier and selectively assigned personal information, said processing request containing the personal identifier, and said identifier containing information to identify said branch, said distributed processing apparatus executing a processing, for outputting the update command to said processing host, for judging whether or not said personal identifier is related to said branch, for retrieving said personal information from said branch personal data base in accordance with said personal identifier when it is judged that said personal identifier is related to said branch, for outputting the retrieval command to said information supply host to receive the retrieved personal information when it is judged that said personal identifier is not related to said branch, and for supplying the retrieved personal information together with the processing result to said terminal in response to the update result received from the processing host.

6. An integrated information processing system according to claim 5, wherein each of said personal records contains a personal name, and said distributed processing apparatus further includes:

means for retrieving personal names if personal records each of which has the same information as said personal information having said personal identifier, from said branch personal data base in response to a retrieval command containing the personal identifier.

7. An integrated information processing system according to claim 5, wherein same of said personal records contains an identifier of a group, and said distributed processing apparatus further includes:

means for retrieving assigned information of a personal record which belongs to the same group as the retrieved personal record having said personal identifier said person belongs, from said branch personal data base in response to said processing request when retrieved personal record having said personal identifier does not include assigned information, and for supplying the retrieved information together with the processing result.

8. An integrated information processing system comprising:

a communication network;

an information supply host connected to said communication network, and including a master personal data base, said master personal data base including a plurality of personal records, and each of said personal records containing a personal identifier and the attribute information, for retrieving the attribute information from said master personal data base in response to an inputted retrieval command, to thereby output the retrieved attribute data;

a processing host connected to said communication network, and including a master file to store a processing result, for updating said master file in response to an inputted update command, thereby outputting an updated result; and a distributed information supply apparatus installed at a certain business office and connected to said communication network and a terminal, comprising:

a business office personal data base including a plurality of personal records related to said business office, each of said personal records containing a personal identifier and said attribute information;

an information file for storing a condition with which the attribute information should satisfy, and information which should be provided when said condition is satisfied;

a distributed processing apparatus connected to a terminal and responsive to a processing request inputted from said terminal, said processing request containing the personal identifier, and said identifier containing information to identify the business office, for executing a processing, for outputting the update command to said processing host, for judging whether or not said personal identifier is related to said business office, for retrieving said personal attribute data from said business office personal data base in accordance with said personal identifier when it is judged that said personal identifier is related to said business office, for outputting the retrieval command to said information supply host to receive the attribute information when said personal identifier is not related to said business office, for retrieving information from said information file in accordance with the retrieved attribute information, and for supplying the retrieved information together with the processing result to said terminal in accordance with the update result received from the processing host.

9. An information processing system performing a transaction processing with a customer, comprising:

input means for inputting information for specifying a customer or a service; a customer database storing, for each customer, attribute information for the relevant customer and service information to be promoted to the relevant customer;

a service file storing, for each service, service information of the relevant service and information representing sales objective customer conditions of the relevant service;

processing means for retrieving, when in formation specifying a customer is received from said input means, attribute information of the customer specified by said input information from the customer database, and based on the retrieved attribute information, retrieving service information which has sales objective customer conditions which satisfy said attribute information from said service file, while retrieving from said customer database, when information specifying a service is received from said input means, a customer who has service information of the service specified by said input information as one to be promoted to the customer; and output means for outputting the service information and the customer information retrieved by said processing means.

* * * * *